United States Patent
Vaucher

(10) Patent No.: US 8,437,815 B2
(45) Date of Patent: *May 7, 2013

(54) SUPERCONDUCTING ROTARY MOTOR

(75) Inventor: Alexander R. Vaucher, Chino Hills, CA (US)

(73) Assignee: Vaucher Aerospace Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,060

(22) Filed: Jun. 28, 2011

(65) Prior Publication Data

US 2012/0010081 A1    Jan. 12, 2012

Related U.S. Application Data

(60) Provisional application No. 61/361,857, filed on Jul. 6, 2010.

(51) Int. Cl.
*F16C 39/06*    (2006.01)

(52) U.S. Cl.
USPC .......................................................... 505/166

(58) Field of Classification Search .................. 505/166, 505/211
See application file for complete search history.

(56) References Cited

U.S. PATENT DOCUMENTS

| | | | |
|---|---|---|---|
| 2,725,474 A | 11/1955 | Ericsson et al. |
| 3,188,579 A | 6/1965 | Meiklejohn |
| 3,363,200 A | 1/1968 | Jaklevic et al. |
| 4,901,038 A | 2/1990 | Dusclaux et al. |
| 5,015,622 A | 5/1991 | Ward et al. |
| 5,122,506 A | 6/1992 | Wang |
| 5,126,317 A | 6/1992 | Agarwala |
| 5,410,199 A | 4/1995 | Kinugasa et al. |
| 5,559,384 A | 9/1996 | Boland et al. |
| 5,805,036 A | 9/1998 | Hodge et al. |
| 5,831,362 A | 11/1998 | Chu et al. |
| 6,175,175 B1 | 1/2001 | Hull |
| 6,231,011 B1 | 5/2001 | Chu et al. |
| 6,762,522 B2 | 7/2004 | Steinmeyer |
| 6,861,770 B2 | 3/2005 | Travers |
| 6,876,877 B2 | 4/2005 | Eden |
| 6,894,406 B2 | 5/2005 | Kinder |
| 7,098,559 B2 | 8/2006 | Travers |

*Primary Examiner* — Colleen Dunn
(74) *Attorney, Agent, or Firm* — Knobbe, Martens, Olson & Bear LLP

(57) ABSTRACT

A motor and a method of operating the motor are provided. The motor includes a stator including a high-temperature superconductor material at a temperature. The superconductor material is in a superconducting state in the presence of an external magnetic field below a critical field strength, wherein the critical field strength is a function of the temperature of the superconductor material. The motor further includes a rotor including a plurality of permanent magnets and configured to rotate about an axis, wherein each magnet of the plurality of permanent magnets has a magnetic field that interacts with the superconductor material. A sum of a non-zero time-invariant magnetic field strength and a time-varying magnetic field strength cycles between at least a first field strength below the critical field strength for the superconductor material at the temperature and at least a second field strength above the critical field strength for the superconductor material at the temperature, such that the portions of the material cycles between a superconducting state and a non-superconducting state. A time-varying force is applied to the rotor by an interaction of the rotor's magnetic field with the portions of the superconductor material. In certain embodiments, a motor is provided.

16 Claims, 9 Drawing Sheets

$T > T_c$ $T < T_c$

SUPERCONDUCTING ROTARY MOTOR

CROSS-REFERENCE TO RELATED APPLICATIONS

The present application claims the benefit of priority to U.S. Provisional Appl. No. 61/361,857, filed Jul. 6, 2010, which is incorporated in its entirety by reference herein. The present application is related to the following U.S. patent applications, filed on even date herewith, and incorporated in their entireties by reference herein: U.S. patent application Ser. No. 13/171,062; U.S. patent application Ser. No. 13/171,071; U.S. patent application Ser. No. 13/171,074; U.S. patent application Ser. No. 13/171,016; and U.S. patent application Ser. No. 13/171,052.

BACKGROUND

1. Field of the Invention

The present invention relates generally to motors utilizing superconductivity.

2. Description of the Related Art

The phenomenon of superconductivity was discovered in 1911 in the Netherlands by Kamerlingh Onnes and collaborators (see, H. K. Onnes, Commun. Phys. Lab. University of Leiden, Suppl., 34b (1913)). Since that time, it has been exploited for many applications.

The phenomenon of superconductivity is one of the most amazing physical phenomena discovered thus far. It falls under a larger category of physical phenomenon known collectivity as "critical phenomenon," "phase transitions," or "correlated systems." Substances that exhibit these phenomena undergo a transformation that affects their physical properties on a macroscopic scale in a dramatic and observable way. This radical change in behavior usually occurs at a particular temperature called the "critical temperature." The onset of the transitions are predictable and are accompanied by a highly correlated behavior below the critical temperature, for the electrons in the substance, as in the case of superconductors, or for the particles making up the substance as in the case of superfluids. For a general discussion of critical phenomenon, see Tinkham, M. *Introduction to Superconductivity*, $2^{nd}$ ed., McGraw-Hill, (1996). The phenomenon of superconductivity is discussed herein and a certain property of its behavior is identified for its useful potential applications in certain embodiments described herein (e.g., for oscillators, sensors, generators, and motors).

As mentioned above, superconductivity is one of the many manifestations of critical phenomenon known in physics. Superconductivity is characterized by the complete absence of electrical resistance in a substance below the critical temperature. Not all materials exhibit superconductivity. Known superconductors include some metals or alloys of metals, which become superconducting at temperatures around 4 to 30 degrees Kelvin. More recently, certain ceramic materials have been discovered that exhibit superconductivity at a relatively high temperature around 93 degrees Kelvin (see, Bendorz, J. G., Müller, K. A., Z. Phys. B64, 189 (1986)). This is particularly useful as it can be conveniently attained using liquid nitrogen which is at 77 degrees Kelvin. This class of "high temperature superconductors" (HTS) has opened up a whole new avenue of possibilities of superconductivity; however, this technology remains largely undeveloped.

SUMMARY

In certain embodiments, a motor is provided. The motor comprises a stator comprising a high-temperature superconductor material at a temperature. The superconductor material is in a superconducting state in the presence of an external magnetic field below a critical field strength, wherein the critical field strength is a function of the temperature of the superconductor material. The motor further comprises a rotor comprising a plurality of permanent magnets and configured to rotate about an axis, wherein each magnet of the plurality of permanent magnets has a magnetic field that interacts with the superconductor material. The motor further comprises a first plurality of superconducting coils configured to apply a non-zero time-invariant magnetic field strength to the superconductor material. The motor further comprises a second plurality of superconducting coils configured to apply a time-varying magnetic field strength to corresponding portions of the superconductor material. A sum of the non-zero time-invariant magnetic field strength and the time-varying magnetic field strength cycles between at least a first field strength below the critical field strength for the superconductor material at the temperature and at least a second field strength above the critical field strength for the superconductor material at the temperature, such that the portions of the material cycles between a superconducting state and a non-superconducting state. A time-varying force is applied to the rotor by an interaction of the rotor's magnetic field with the portions of the superconductor material.

In certain embodiments, a method of operating a motor is provided. The method comprises providing a motor comprising a stator comprising a high-temperature superconductor material at a temperature. The superconductor material is in a superconducting state in the presence of an external magnetic field below a critical field strength, wherein the critical field strength is a function of the temperature of the superconductor material. The motor further comprises a rotor comprising a plurality of permanent magnets and configured to rotate about an axis, wherein each magnet of the plurality of permanent magnets has a magnetic field that interacts with the superconductor material. The motor further comprises a first plurality of superconducting coils configured to apply a non-zero time-invariant magnetic field strength to the superconductor material. The motor further comprises a second plurality of superconducting coils configured to apply a time-varying magnetic field strength to corresponding portions of the superconductor material. A sum of the non-zero time-invariant magnetic field strength and the time-varying magnetic field strength cycles between at least a first field strength below the critical field strength for the superconductor material at the temperature and at least a second field strength above the critical field strength for the superconductor material at the temperature, such that the portions of the material cycles between a superconducting state and a non-superconducting state. A time-varying force is applied to the rotor by an interaction of the rotor's magnetic field with the portions of the superconductor material. The method further comprises applying the non-zero time-invariant magnetic field strength to the portions of the superconductor material by using the first plurality of superconducting coils. The method further comprises applying a time-varying force to the plurality of magnets by using the second plurality of superconducting coils to apply the time-varying magnetic field strength to the portions of the superconductor material. Each of the portions of the superconductor material cycles between a superconducting state and a non-superconducting state.

DETAILED DESCRIPTION

In certain embodiments described herein, a new oscillator based on the phenomenon of superconductivity is realized and identified for its many potential applications (e.g., oscillators, sensors, generators, and motors). This oscillator is based on the Meissner Effect of superconductivity, and is used to create a "Superconducting Oscillator" that can be used to apply a time-varying force to a magnet, which has many potential applications among which are motors of all types, and various sensors. Certain embodiments described herein exploit one property which has many potential applications (e.g., in oscillators, sensors, generators, and motors).

Figure 1A:
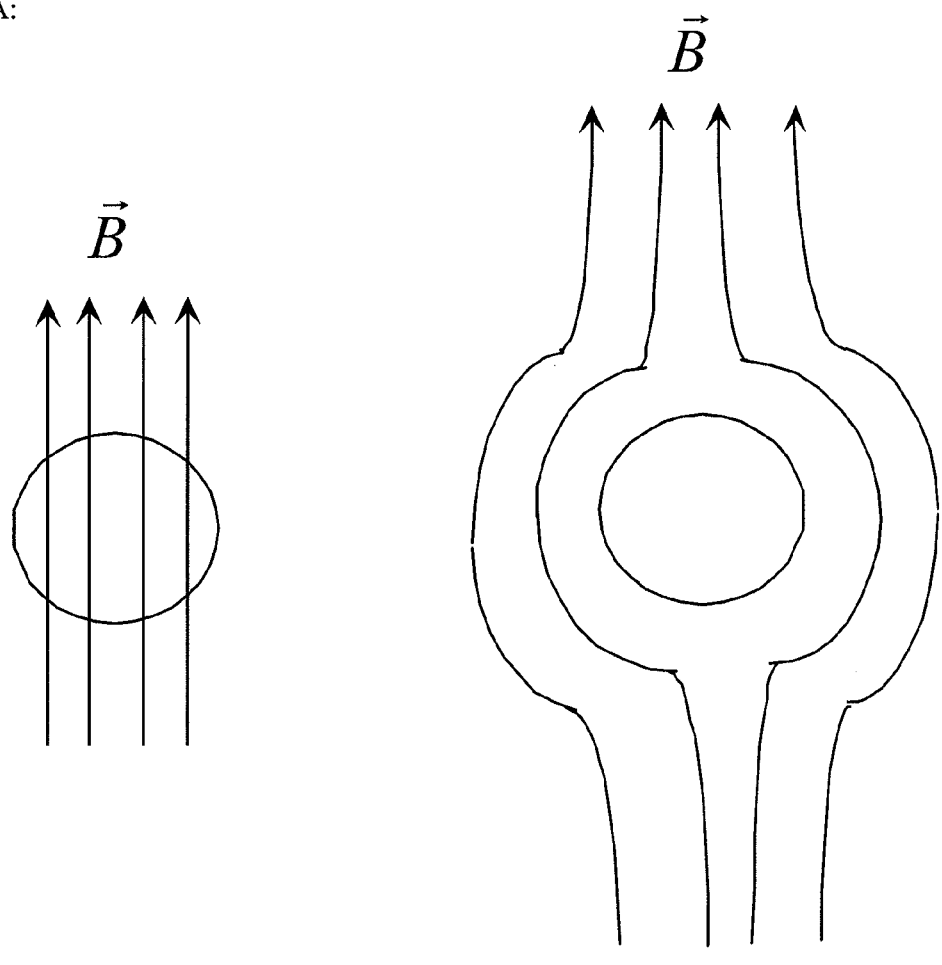
FIG. 1A schematically illustrates a superconductor material at a temperature greater than the critical temperature immersed in an external magnetic field then cooled below its critical temperature.
Figure 1B:
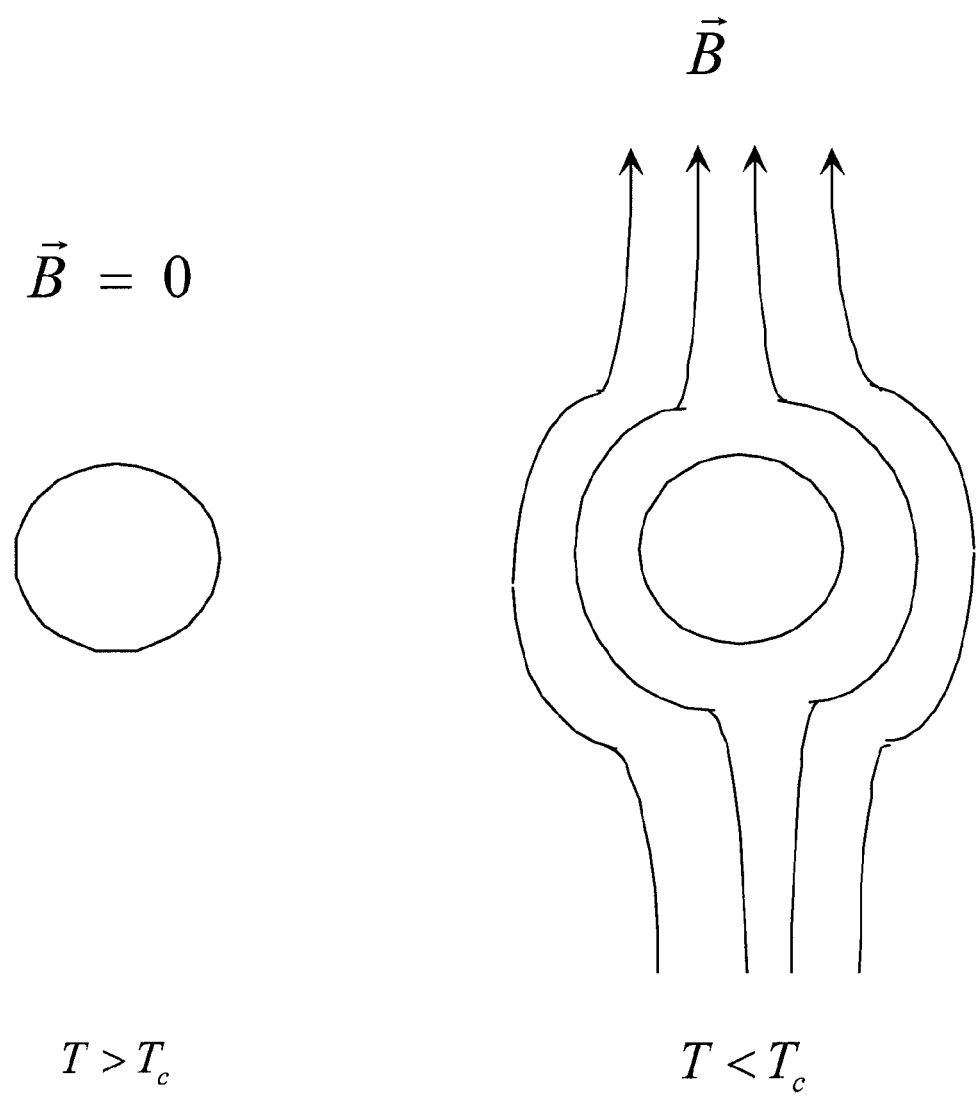
FIG. 1B schematically illustrates a superconductor material at a temperature greater than the critical temperature in zero external magnetic field then cooled below its critical temperature.
Figure 2:
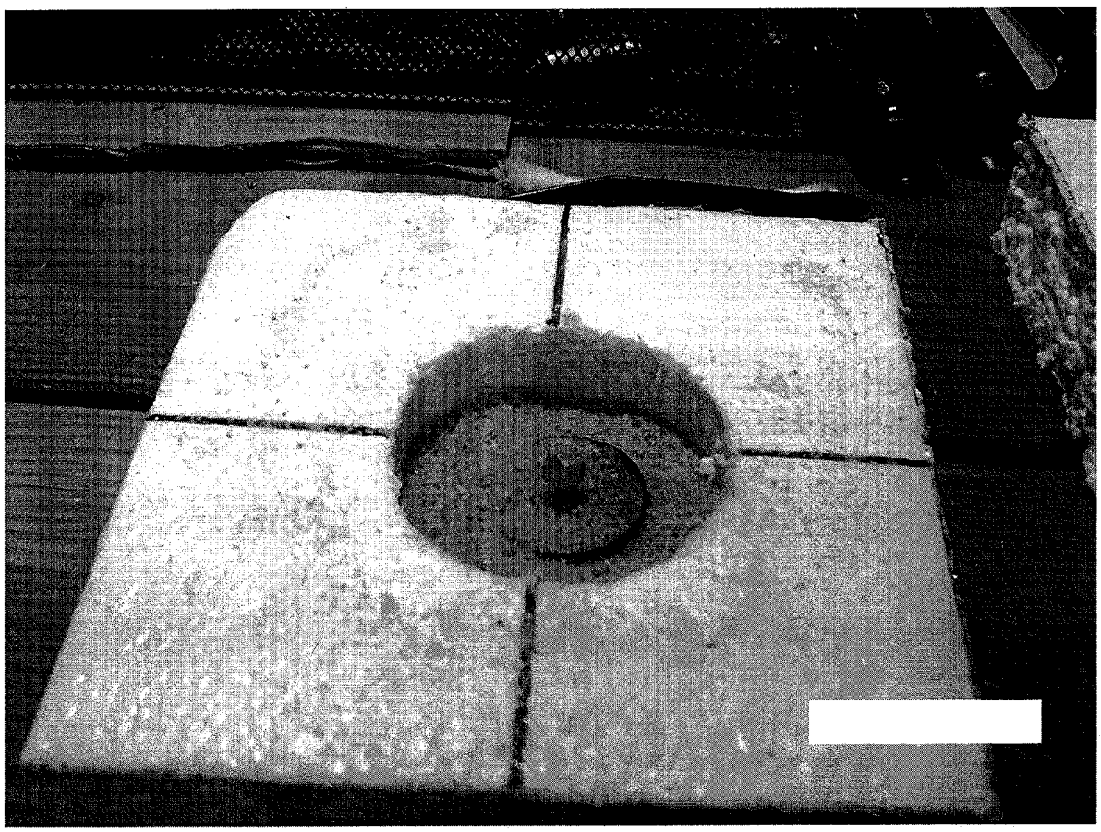
FIG. 2 is a photograph of a small permanent magnet floating above a superconductor material that is below its critical temperature.

The absence of electrical resistance is only one of the properties exhibited by superconductors below the critical temperature. Another very striking effect is the Meissner Effect, named after W. Meissner (see, W. Meissner, R. Ochsenfeld, Naturwiss, 21: 787 (1933)). It was observed that when a superconducting material is cooled in the presence of a magnetic field, when the temperature dropped below the critical temperature, the magnetic field was expelled from the superconductor, as shown schematically in FIG. 1A. This is because the superconductor acts as a perfect diamagnet, expelling the magnetic field. The mechanism by which this occurs is simple; the external magnetic field induces currents in the superconductor. These currents circulate in such a way as to generate a magnetic field that opposes the external field, thus the net field in the superconductor is zero. The same effect also occurs if the magnetic field is introduced after the superconductor is cooled below its critical temperature, as shown in FIG. 1B. This property has the striking effect of causing the superconductor to repel the source of the external magnetic field. FIG. 2 is a photograph showing this phenomenon using a small permanent magnet floating above a superconductor that is below its critical temperature due to the force applied to the magnet by the interaction of its magnetic field with the superconducting material opposing the force of gravity on the magnet. In FIG. 2, the magnet is Neodymium type, the superconductor is ceramic HTS type, YBCO cooled to liquid nitrogen temperature.

Superconductivity in the presence of an external magnetic field follows certain limitations. For a fixed temperature below the critical temperature, as the external magnetic field strength is increased, superconductivity is lost. The value of the magnetic field strength required to destroy the superconducting state generally increases as the operating temperature is lowered below the critical temperature. This phenomenon follows an empirical law (depicted in FIG. 3) in the form of:

$$H_c(T) = H_c(0)\left[1 - \left(\frac{T}{T_c}\right)^2\right] \quad (1)$$

Figure 3:
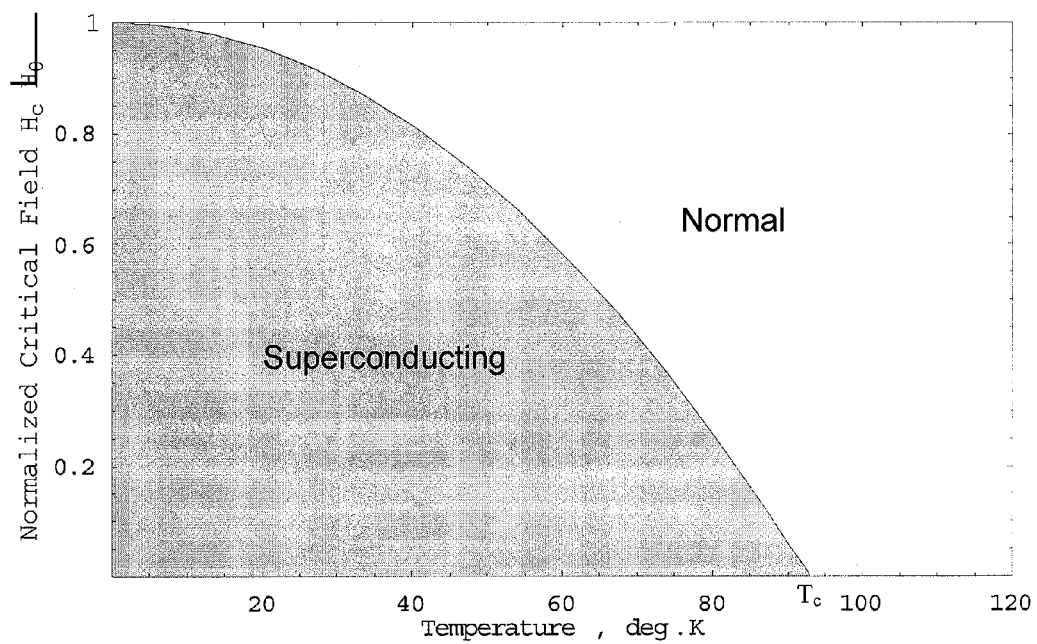
FIG. 3 is a plot of normalized critical field versus temperature for YBCO high temperature superconductor material having a critical temperature at about 93 degrees Kelvin. The region below the curve is the superconducting state, and the region outside the curve is the normal or non-superconducting state.

FIG. 3 is a plot of normalized critical field strength versus temperature for YBCO high temperature superconductor material having a critical temperature at about 93 degrees Kelvin. The region below the curve is the superconducting state, and the region outside the curve is the normal or non-superconducting state. FIG. 3 shows that the superconducting region is confined inside the critical field strength curve. As the temperature changes above and below the critical temperature, the superconductor switches between the normal and superconducting states. This oscillation however is very slow, as the temperature change is slow in nature.

Figure 4:
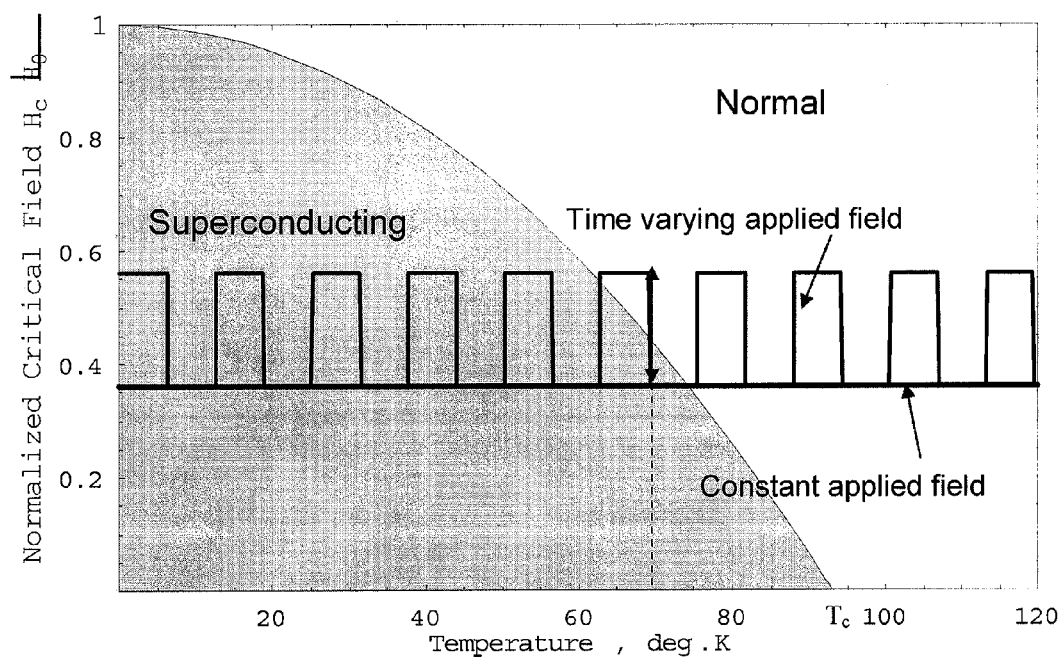
FIG. 4 is the plot of FIG. 3 with a plot of a time-varying external magnetic field applied at a specific temperature superimposed over the applied external time invariant or constant magnetic field.

The switch between the normal and superconducting states also occurs as the magnetic field strength is switched above or below the critical field strength. In this case, however, the oscillation is instantaneous, because the mechanism responsible is a second order phase transition. In certain embodiments, a convenient temperature can be chosen and a time-varying (e.g., oscillating) component field strength can be applied at the critical field strength value, as schematically illustrated in FIG. 4. Such a configuration will cause the superconductor material to oscillate between the normal and superconducting states at the frequency of the applied field. This in turn will impose a time-varying (e.g., periodic) behavior on the Meissner effect. Thus, a magnet floating above the superconductor will exhibit up and down oscillations at the frequency of the applied field. Since this change of state is virtually instantaneous at a particular fixed temperature, the oscillation of the superconductor will lag the applied field by the relaxation time for the superconductor. This is the time it takes to form the ordered state, in the femtosecond range, which is a very short time. This process is shown schematically in FIG. 4.

FIG. 4 is the plot of FIG. 3 with a plot of a time-varying external magnetic field strength applied to the material at a specific temperature superimposed over the applied external time-invariant or constant magnetic field strength. A time-varying external magnetic field strength (e.g., square wave, with zero minimum) applied at a specific temperature, and superposed over the applied external constant field strength, will force the material into the normal state region, thus destroying superconductivity. During the next half cycle, the total field strength is less than the critical field strength, and superconductivity is restored. The driving frequency is that of the applied field. The limiting frequency is due to the relaxation time for the superconductor, on the order of $10^{-15}$ seconds in certain embodiments. Since the relaxation time of the superconductor material is of the order of $10^{-15}$ seconds, the applied frequency can be very high, e.g., in the terahertz range. Most practical applications will be at much lower frequencies, e.g., in the Hz, kHz, MHz, or GHz ranges. For most mechanical applications, the frequency is likely to be in kHz range. The superconductor material lags the applied field by a phase factor of the order of the relaxation time. In FIG. 4, the driving field of the example oscillator is applied at about 70 degrees Kelvin, which is well below the critical temperature, utilizing DC external field strength of about 0.36 ($H_c/H_0$) where $H_0=H_c(0)$. In certain embodiments, the AC field strength can be applied anywhere on the critical field strength (e.g., at a point of low field strength, but not too close to the critical temperature).

In certain embodiments, the operating temperature is selected to be at or below 93 degrees Kelvin. The operating temperature of certain embodiments is chosen to be sufficiently below the critical temperature since near the critical temperature some instability could take place as the superconductor material transitions between states. As the temperature is chosen increasingly below the critical temperature, the required field strength to change states will increase. Therefore, it becomes a design trade-off issue which will be determined depending on the particular application (e.g., oscillators, sensors, generators, and motors) for a specific requirement. A helpful criterion for determining an appropriate operating temperature below the critical temperature is to know the error margin in the specific temperature control mechanism being used. For example, if a heater with a feedback loop is used that has a response of 0.5 degree Kelvin above or below a chosen operating temperature (set point), then this set point should be at least 0.5 degree Kelvin below the critical temperature. It is a good design practice to select an operating temperature that is two, three, or more times the error margin below the critical temperature (e.g., at least 2 to 5 degrees Kelvin).

The source of the time-invariant or DC field strength in certain embodiments is a superconducting coil. The source of the time-varying or AC field strength in certain embodiments is a coil with just enough current to move the superconductor material into the normal region and back to the superconducting region. Thus, the power used to drive the motor is in the smaller applied time-varying field. In certain embodiments, the coil generating the time-varying field strength is a superconducting coil.

As mentioned above, the superconducting state is destroyed if the superconductor material is immersed in a sufficiently strong magnetic field. This transition to the normal state is quite rapid, unlike the transition which occurs at the critical temperature. The reverse is also true, when the strong applied magnetic field strength is reduced below the critical field strength value, the superconducting state returns just as rapidly. Making use of this phenomenon, the motor design of certain embodiments described herein is that of a rotary type, similar to traditional AC electric motors.

Figure 5A:
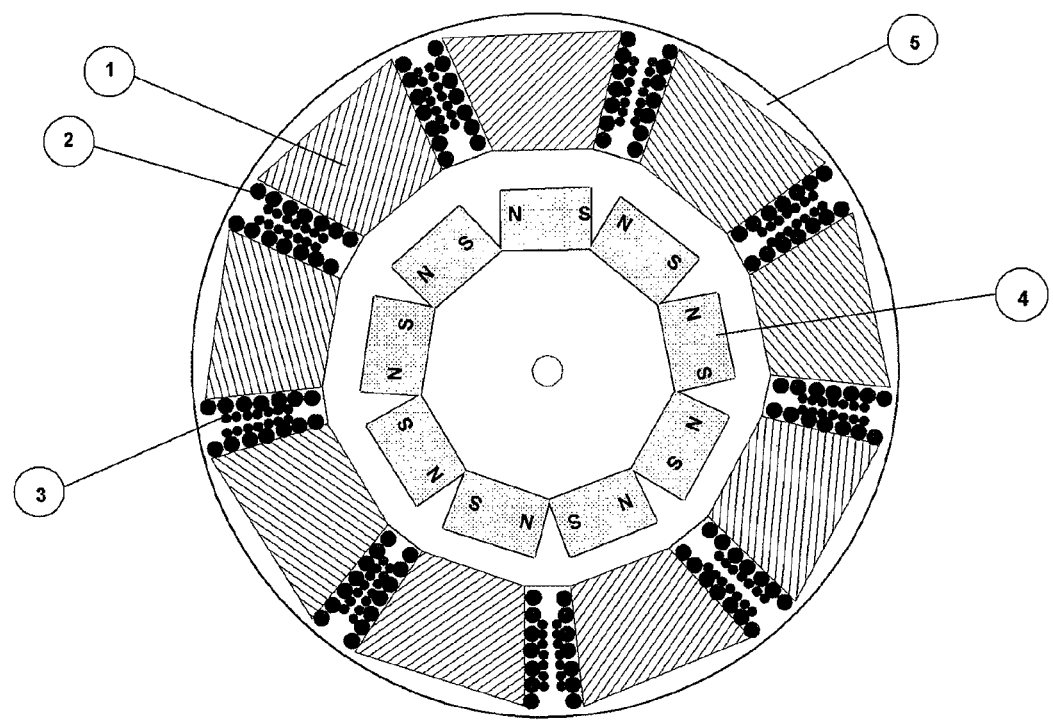
FIG. 5A schematically illustrates an example configuration of a rotary motor having a stator with nine heads and a rotor with nine permanent magnets in accordance with certain embodiments described herein.
Figure 5B:
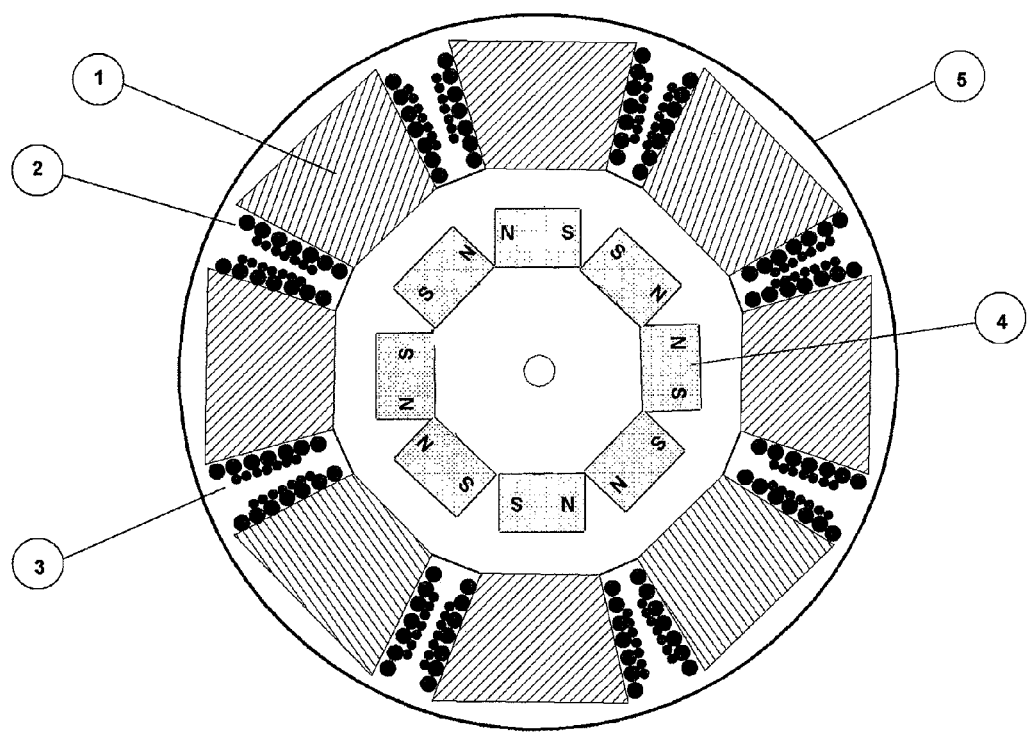
FIG. 5B schematically illustrates an example configuration of a rotary motor having a stator with eight heads and a rotor with eight permanent magnets in accordance with certain embodiments described herein.

FIGS. 5A and 5B schematically illustrate two example motors in accordance with certain embodiments described herein. In certain embodiments, the motor comprises a stator 1 and a rotor 4. The motor further comprises primary coils 2 or windings and secondary coils 3 or windings. The stator 1 comprises bulk high-temperature superconductor material and is shaped so that primary coils 2 and the secondary coils 3 can fit within the stator 1. The primary coils 2 comprise superconducting wire in certain embodiments, and the secondary coils 3 comprise normal, non-superconducting conductor in certain embodiments, while in certain other embodiments, the secondary coils 3 comprise superconductor material. The stator 1 of certain embodiments comprises an odd number of independent sections arranged in a circular cylindrical pattern, as schematically illustrated in FIG. 5A. The stator 1 of certain other embodiments comprises an even number of independent sections arranged in a circular cylindrical pattern, as schematically illustrated in FIG. 5B. Each section has one primary coil 2 and one secondary coil 3. In certain embodiments, all the primary coils 2 are made of superconducting wire, and are maintained at a current to produce a field sufficiently below the critical field strength for the superconductor material to be in the superconducting state. In certain embodiments, the currents of the secondary coils 3 are pulsed. When the secondary coils 3 are powered on in certain embodiments, the total magnetic field produced will exceed the critical field strength for the superconductor material in the stator 1, thus no repulsion exists between the stator 1 and the rotor 4. As each of the secondary coils 3 is powered off in sequence, a repulsive force appears between the rotor 4 and the stator 1. This pulsing of off/on is repeated around the secondary coils 3 of the stator 1 in sequence in certain embodiments. The rotor 4 of certain such embodiments will rotate at the pulse frequency of the secondary coils 3.

In certain embodiments, the stator 1, the primary coils 2, and the secondary coils 3 are immersed in a cryostat or dewar (having an outer wall 5) and maintained at a low temperature (e.g., liquid nitrogen temperature). Other coolants or means for cooling the various components of the motor are compatible with certain embodiments described herein.

The rotor 4, at the center of the assembly, comprises strong permanent magnets which are placed with their poles alternating and their external field lines parallel to the surface of the stator 1. As the primary coils 2 are energized to below the critical field strength in certain embodiments, the stator 1 goes in the superconducting state, and exerts forces through the Meissner effect on the magnets of the rotor 4. However, since these forces are equal in all direction, no motion is realized yet. As the secondary coils 3 are energized in sequence in certain embodiments, sections of the stator 1 will become normal or non-superconducting momentarily, and thus a net force will be realized on the rotor 4, causing it to rotate. As the secondary coils 3 are pulsed in sequence in certain embodiments, this rotation is maintained at the pulse frequency of the secondary coils 3.

In FIGS. 5A and 5B, there are two possible configurations shown. FIG. 5A shows a rotor 4 with an odd number of poles, with the rotor magnets arranged in a NS, NS, NS . . . sequence. FIG. 5B shows a rotor 4 with an even number of poles with the rotor magnets arranged a NS, SN, NS . . . sequence. The configuration of FIG. 5B forces more of the field lines to close outside the permanent magnets, thus allowing more field to interact with the superconductor of the stator 1. This however will come at the cost of higher stress on the rotor assembly due to the opposing poles. Both configurations however work according to the same principles. The rotor assembly of certain embodiments is not cooled, but is maintained in a partial vacuum to minimize air resistance. Power is delivered through the center shaft of the rotor to a mechanical storage flywheel in certain embodiments.

Figure 6A:
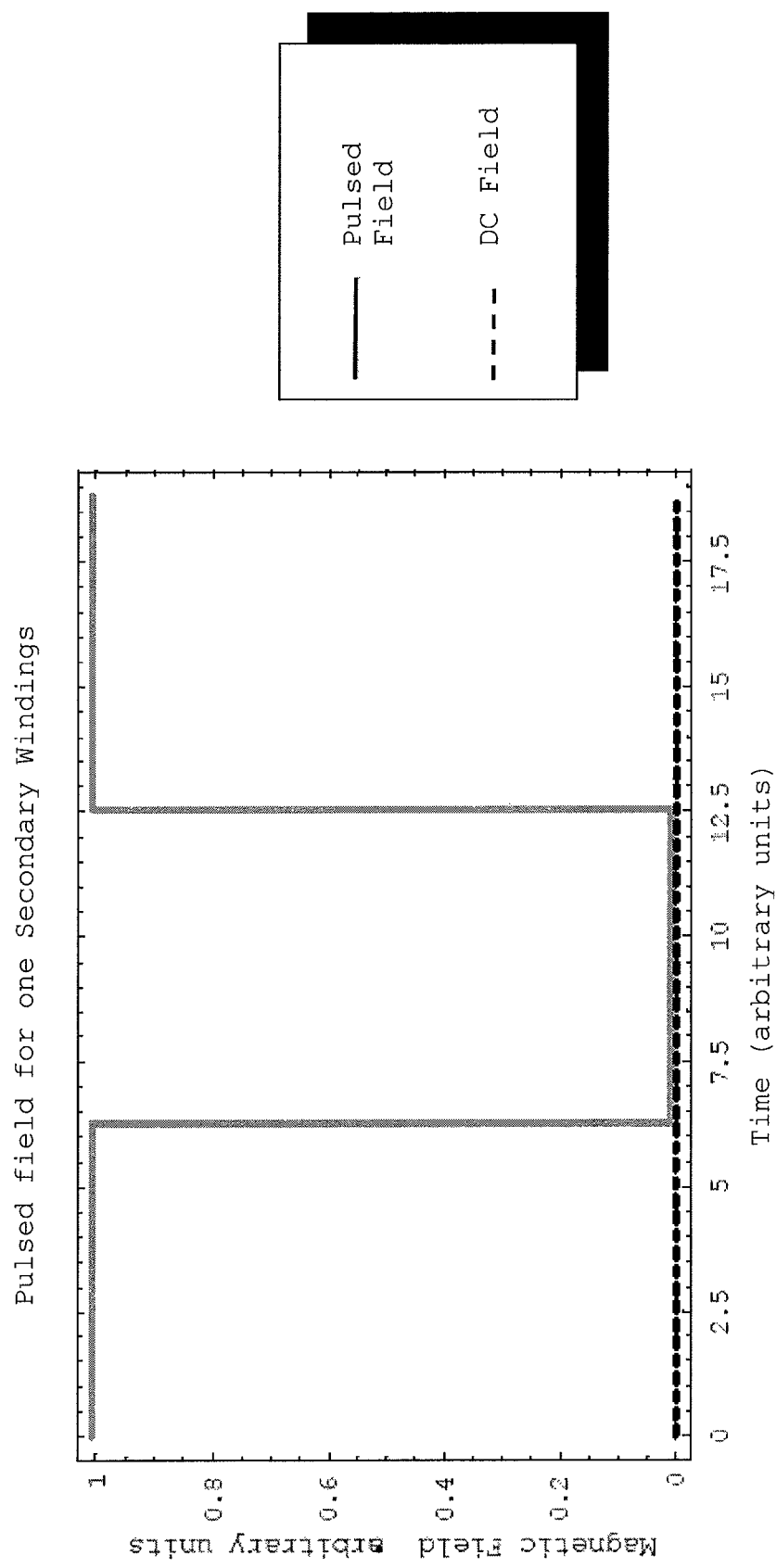
FIG. 6A is a plot of an example of the pulsing applied to each secondary winding in accordance with certain embodiments described herein.
Figure 6B:
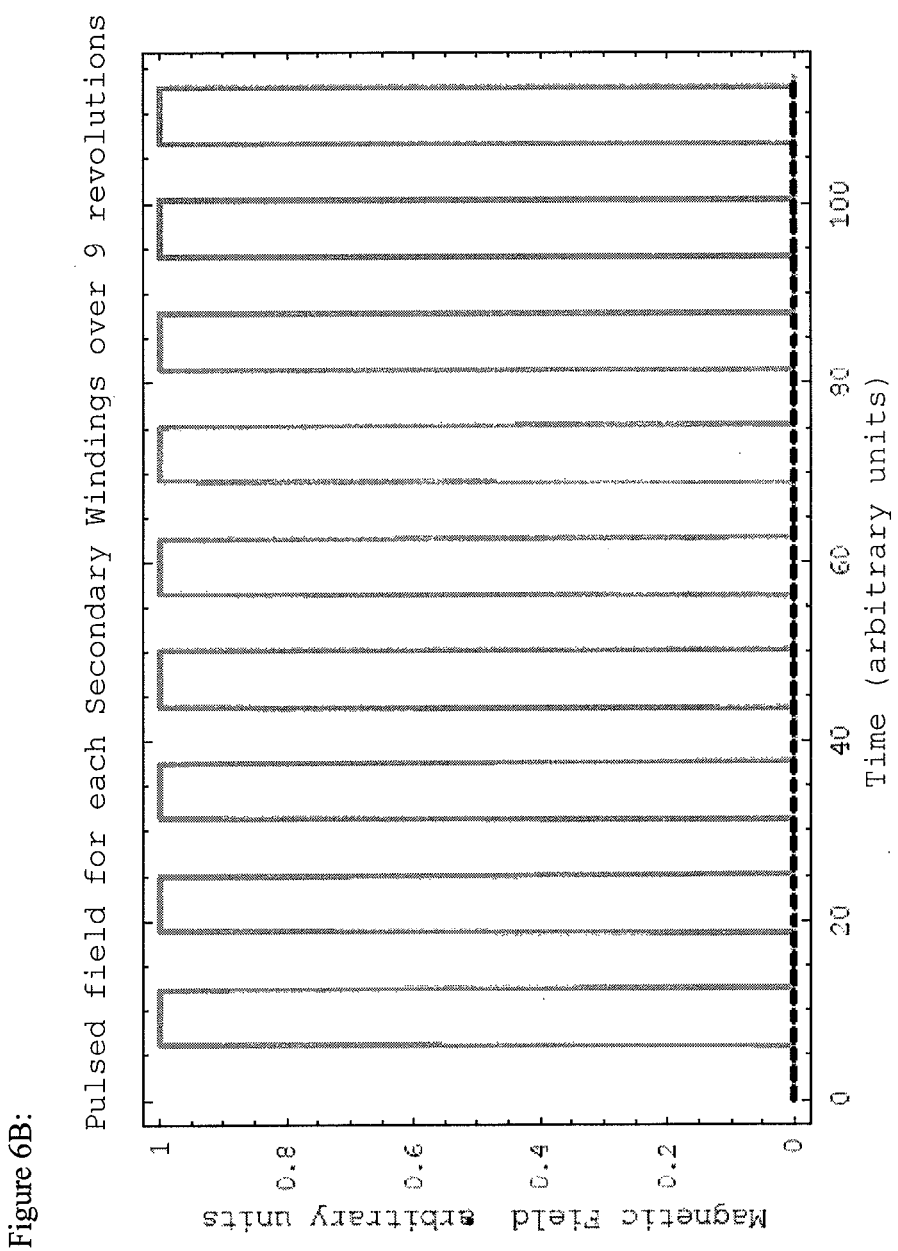
FIG. 6B is a plot of an example of the pulse pattern for each secondary winding over a nine revolution period in accordance with certain embodiments described herein.

FIGS. 6A and 6B show example operating cycles of the motor. FIG. 6A shows the pulsing applied to each, secondary coil 3 in certain embodiments. Each of the secondary coils 3 are pulsed in sequence. The phase velocity of the pulses corresponds to the motors revolution speed. FIG. 6B shows the pulse pattern for each secondary coil 3 over a nine revolution period. Each secondary coil 3 is pulsed off once per revolution in sequence.

The choice of the primary coil and secondary coil currents is a trade-off between the desired performance requirements, and the quality of the superconductor material. The current in each of the primary coils is selected to be sufficient to bring the applied field from that primary coil to within range of the critical field at the chosen operating temperature. The remaining field used to exceed the critical field is to be applied by the secondary coils. The range of the current flowing through each coil is a particular design parameter. For example, if the critical field at some operating temperature is about 8 Tesla, the field from the primary coil can be set at 7 Tesla. This can be done by charging the primary coil accordingly to deliver 7 Tesla. The remaining 1 Tesla can be applied using the secondary coil. In certain embodiments, the secondary coil is pulsed slightly above the critical field to ensure that the total field exceeds the critical field even accounting for slight temperature fluctuations. When the secondary coils are pulsed on and off in sequence, the Meissner effect takes place sequentially, and the motor turns. The pulsed field is smaller than the primary field in certain embodiments to avoid pulsing a high current, since even superconductors exhibit some AC losses. The question of how to divide the current between the primary and secondary coils also depends on properties of the superconductor. Since the Meissner effect operates in presence of the field of the primary coil, the superconductor critical current will be affected by the presence of this field. In general, critical currents diminish slightly with applied field for all superconductors to varying degrees. For well prepared YBCO, the reduction in critical current is small, and can be compensated for by choosing a smaller field of the primary coil as needed. This in turn will use a larger field from the secondary coil, thus pulsing of slightly higher current.

Certain embodiments described herein can be used in various applications. In certain embodiments, this design is particularly suited to applications requiring a high revolution rate, including, but not limited to propulsion and power generation. The motor can be scaled to any desired power output. The principle of operation does not depend on the scale of the motor. The only limitation is on mechanical integrity of a machine with high rotation rates. With modern materials, mechanical strength far exceeds most known applications to date.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A motor comprising:
   a stator comprising a high-temperature superconductor material at a temperature, wherein the superconductor material is in a superconducting state in the presence of an external magnetic field below a critical field strength, wherein the critical field strength is a function of the temperature of the superconductor material;
   a rotor comprising a plurality of permanent magnets and configured to rotate about an axis, wherein each magnet of the plurality of permanent magnets has a magnetic field that interacts with the superconductor material;
   a first plurality of superconducting coils configured to apply a non-zero time-invariant magnetic field strength to the superconductor material; and
   a second plurality of superconducting coils configured to apply a time-varying magnetic field strength to corresponding portions of the superconductor material, wherein a sum of the non-zero time-invariant magnetic field strength and the time-varying magnetic field strength cycles between at least a first field strength below the critical field strength for the superconductor material at the temperature and at least a second field strength above the critical field strength for the superconductor material at the temperature, such that the portions of the material cycles between a superconducting state and a non-superconducting state, wherein a time-varying force is applied to the rotor by an interaction of the rotor's magnetic field with the portions of the superconductor material.

2. The motor of claim 1, wherein the superconductor material comprises YBCO high-temperature superconductor material.

3. The motor of claim 1, wherein the superconductor material is in a non-superconducting state without an external magnetic field strength being applied to the superconductor material when the temperature (T) is above a critical temperature ($T_c$), and the critical field strength ($H_c$) is a function of the temperature (T) given by:

$$H_c(T) = H_c(0)\left[1 - \left(\frac{T}{T_c}\right)^2\right],$$

where $H_c(0)$ is a critical field strength of the superconductor material at zero degrees Kelvin.

4. The motor of claim 1, wherein the superconductor material is at a temperature at or below liquid nitrogen temperature.

5. The motor of claim 1, wherein the superconductor material is at a temperature at or below 93 degrees Kelvin.

6. The motor of claim 1, further comprising a dewar in thermal communication with the superconductor material, the dewar configured to contain liquid nitrogen to a level sufficient to cool the superconductor material to a temperature at or below liquid nitrogen temperature.

7. The motor of claim 1, wherein the plurality of magnets is an even number of magnets.

8. The motor of claim 1, wherein the plurality of magnets is an odd number of magnets.

9. The motor of claim 1, wherein the time-varying magnetic field strength has a square wave, and a zero minimum field strength.

10. The motor of claim 1, wherein the non-zero time-invariant magnetic field strength has a field strength equal to about 36% of a critical field strength of the superconductor material at zero degrees Kelvin.

11. A method of operating a motor, the method comprising:
    providing a motor as recited in claim 1;
    applying the non-zero time-invariant magnetic field strength to the portions of the superconductor material by using the first plurality of superconducting coils; and
    applying a time-varying force to the plurality of magnets by using the second plurality of superconducting coils to apply the time-varying magnetic field strength to the portions of the superconductor material, such that each of the portions of the superconductor material cycles between a superconducting state and a non-superconducting state.

12. The method of claim 11, wherein the time-varying magnetic field strength is sequentially applied to the portions of the superconductor material.

13. The method of claim 11, wherein the superconductor material comprises YBCO high-temperature superconductor material.

14. The method of claim 11, wherein the superconductor material is in a non-superconducting state without an external magnetic field strength being applied to the superconductor material when the temperature (T) is above a critical temperature ($T_c$), and the critical field strength ($H_c$) is a function of the temperature (T) given by:

$$H_c(T) = H_c(0)\left[1 - \left(\frac{T}{T_c}\right)^2\right],$$

where $H_c(0)$ is a critical field strength of the superconductor material at zero degrees Kelvin.

15. The method of claim 11, wherein the superconductor material is at a temperature at or below liquid nitrogen temperature.

16. The method of claim 11, wherein the time-varying magnetic field strength has a square wave, and a zero minimum field strength.

* * * * *